March 21, 1967 L. H. COOK ETAL 3,310,376
PROCESS FOR COMBINED PRODUCTION OF AMMONIA AND UREA
Filed Sept. 9, 1963
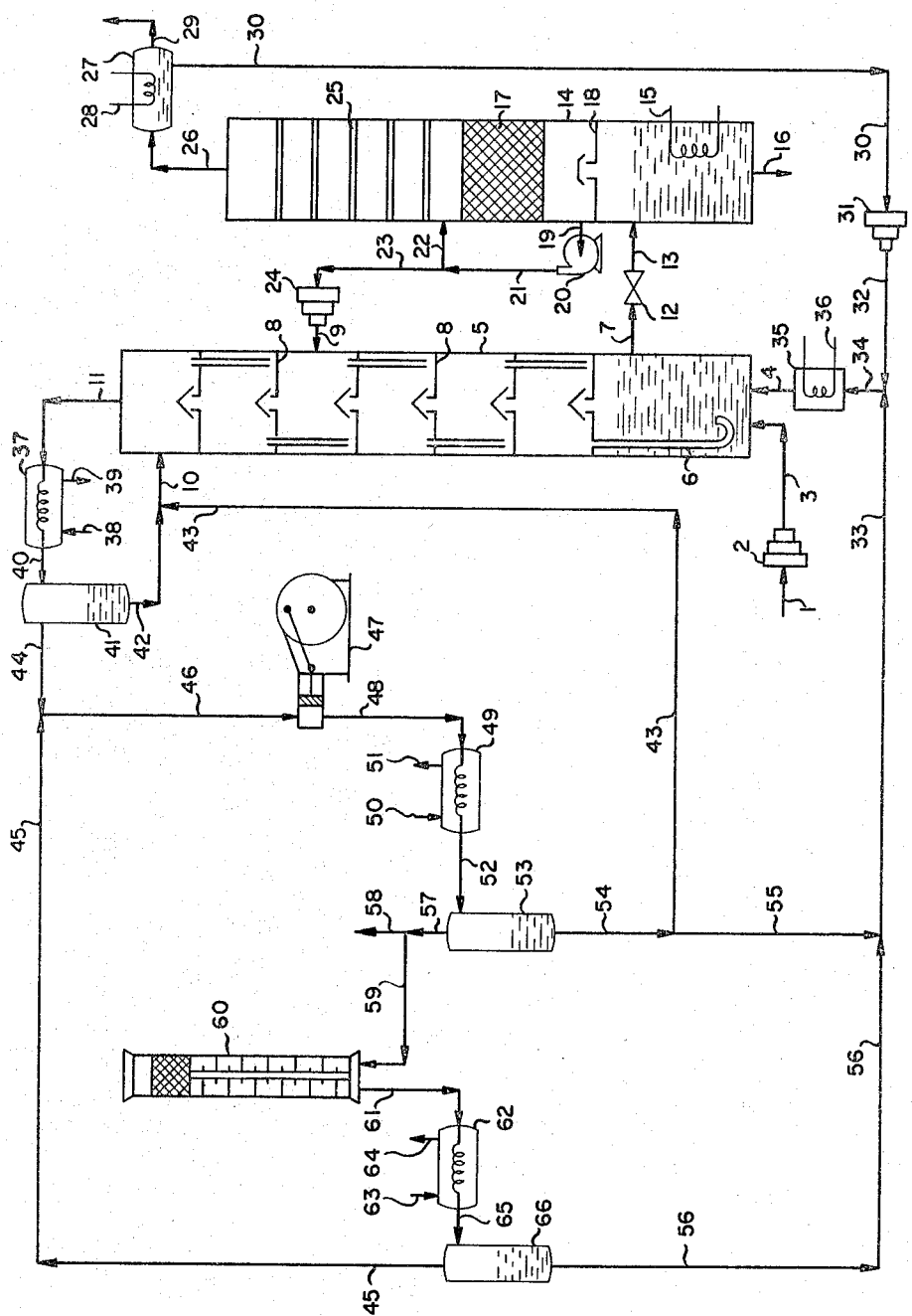
LUCIEN H. COOK
IVO MAVROVIC
*INVENTORS.*
BY J. J. Chaboty
AGENT United States Patent Office 3,310,376
Patented Mar. 21, 1967

3,310,376
PROCESS FOR COMBINED PRODUCTION OF AMMONIA AND UREA
Lucien H. Cook, Port Washington, and Ivo Mavrovic, New York, N.Y., assignors to Chemical Construction Corporation, New York, N.Y., a corporation of Delaware
Filed Sept. 9, 1963, Ser. No. 307,669
11 Claims. (Cl. 23—199)

This invention relates to the combined production of ammonia and urea from synthesis gas. A process is provided which accomplishes the reaction of compressed input synthesis gas containing a substantial proportion of carbon dioxide with synthesized liquid ammonia at elevated pressure. The resulting mixed process stream is reacted under urea synthesis conditions, and carbon dioxide is consumed in the formation of urea. The residual gas phase consisting of hydrogen, nitrogen and ammonia vapor is then passed to ammonia synthesis, and further ammonia synthesis effluent gas is formed. A combined processing sequence is thus provided, which eliminates major processing steps and costs of the prior art.

Ammonia is synthetically produced by the catalytic combination of hydrogen and nitrogen at elevated pressure and temperature. The hydrogen is generally produced from hydrocarbons, by such well-known procedures as catalytic steam reforming or partial oxidation. A typical steam reforming process for the production of ammonia synthesis gas is described in U.S. Patent No. 2,829,113, and a partial oxidation procedure is described in U.S. Patent No. 3,022,148. In these procedures, a crude synthesis gas is produced which principally contains hydrogen, nitrogen, carbon monoxide and steam. The carbon monoxide is catalytically converted to carbon dioxide by reaction with steam, with concomitant production of further hydrogen, as described in U.S. Patents 2,829,113 and 3,010,807. Thus a synthesis gas is produced which contains hydrogen and nitrogen in the required proportions for ammonia synthesis, together with carbon dioxide.

Carbon dioxide has generally been removed from the synthesis gas by scrubbing the gas stream with an absorbent containing an alkaline reagent, such as potassium carbonate or monoethanolamine. A procedure of this nature is described in U.S. Patent No. 2,886,405. The absorbent solution containing dissolved carbon dioxide is regenerated by heating, generally at reduced pressure. Carbon dioxide is thus driven off as a separate gas stream. The resulting synthesis gas stream now containing principally hydrogen and nitrogen together with minor amounts of carbon monoxide, argon and methane, is passed to catalytic methanation or scrubbing with ammoniacal cuprous chloride solution to remove residual carbon monoxide. The final synthesis gas stream is now compressed and passed to high pressure catalytic ammonia synthesis, such as described in U.S. Patent No. 2,853,371.

In a typical urea synthesis procedure, liquid ammonia produced in a manner described supra is reacted at elevated urea synthesis pressure with compressed gaseous carbon dioxide. The carbon dioxide is generally available as a by-product stream from synthesis gas production, as described supra. The reactants initially combine to form ammonium carbamate in a highly exothermic reaction which readily goes to completion. The intermediate ammonium carbamate is then dehydrated to yield urea at elevated pressure. The final urea-forming reaction does not go to completion in practice, and thus a mixed process stream containing urea, water, ammonium carbamate and excess ammonia is generally produced in the urea synthesis autoclave. This mixed process stream is separated into product aqueous urea solution, aqueous ammonium carbamate solution and pure ammonia by established techniques, and the aqueous ammonia carbamate solution is recycled to the urea synthesis autoclave for further conversion to urea.

In the present invention, ammonia synthesis and urea synthesis are combined in a novel manner. In effect, the urea synthesis is employed to remove carbon dioxide from the crude ammonia synthesis gas mixture containing hydrogen, nitrogen and carbon dioxide. Thus, the synthesis gas mixture is compressed and combined with liquid ammonia derived from ammonia synthesis, and the combined gas stream is subjected to urea synthesis. As a result, the carbon dioxide originally in the synthesis gas mixture is converted to urea and ammonium carbamate, and a residual gaseous phase containing only hydrogen, nitrogen and ammonia vapor is separated from the liquid phase containing product urea. The residual gaseous phase is hten passed to ammonia synthesis, while the liquid phase is separated into product aqueous urea solution, aqueous ammonium carbamate solution and excess ammonia. The ammonium carbamate solution and excess ammonia are recycled to urea synthesis. Ammonia reflux is provided for purification of the residual gaseous phase, in a process sequence wherein residual carbon dioxide is condensed from the gaseous phase into the liquid solution as ammonium carbamate.

The process sequence of the present invention provides several outstanding advantages. The capital investment cost and plant utilities requirement of the ammonia synthesis facility are substantially reduced, since the prior art process step involving the scrubbing of the crude synthesis gas with alkaline absorbent reagent for carbon dioxide removal, followed by separate regeneration of the reagent, is completely eliminated.

In addition, substantial compression economy is attained, since ammonia derived at elevated pressure from ammonia synthesis is directly passed to urea synthesis. Further compression economy is obtained due to the combined unitary compression of the total reformed gas mixture including carbon dioxide, as contrasted to prior art compression systems in which the hydrogen-nitrogen gas mixture and the carbon dioxide are separately compressed. The steam which is produced in the gas reform system has been consumed in prior art procedures, for the regeneration of alkaline absorbent reagent employed to scrub carbon dioxide from the synthesis gas stream. Due to the elimination of this processing sequence, the steam is now available for utilization in the urea plant, thus reducing or eliminating steam generation facilities previously required. Finally, passing the crude ammonia synthesis gas stream through urea synthesis results in the absorption of a substantial proportion of inerts such as methane and argon from the gas stream. These inerts are thus prevented from entering the ammonia synthesis loop, and are eventually discharged via the urea purification system. Thus, the quantity of inerts which must be purged from the ammonia synthesis loop, with concomitant loss of ammonia and synthesis gas, is substantially reduced.

It is an object of the present invention to produce ammonia and urea in a combined process.

Another object is to employ urea synthesis as a means of removing carbon dioxide from ammonia synthesis gas.

A further object is to provide an improved complete recycle process for urea production.

An additional object is to reduce the capital investment and operating utilities cost of an ammonia plant.

Still another object is to combine the synthesis of urea with the synthesis of ammonia.

These and other objects and advantages of the present invention will become evident from the description which follows. Referring to the figure, a crude synthesis gas stream 1 principally containing hydrogen, nitrogen and carbon dioxide is derived from the reforming of a hydrocarbon followed by catalytic CO-oxidation. As discussed supra, the hydrocarbon reform step, not shown, may consist either of catalytic steam reform or partial oxidation of a fluid hydrocarbon. Stream 1 is usually produced at a pressure below 600 p.s.i.g., and is compressed in compressor 2 to the required elevated pressure for urea and ammonia synthesis, generally in the range of 2500 p.s.i.g. to 6000 p.s.i.g. A preferred pressure range for the compressed gas stream 3 is from 4000 p.s.i.g. to 4500 p.s.i.g., since this pressure range is conventional for both urea and ammonia synthesis.

The compressed stream 3 is now combined with synthesized liquid ammonia stream 4, derived in a manner to be described infra. The combination takes place in elevated pressure vessel 5, in which both urea synthesis and removal of carbon dioxide from the gas phase take place. Vessel 5 contains a lower liquid retention section, in which downflowing ammonium carbamate solution is admitted via dip pipe 6. Most of the carbon dioxide contained in stream 3 is combined with ammonia from stream 4 to form ammonium carbamate, which under the conditions of elevated pressure and temperature typically in the range of 150° C. to 200° C. is dehydrated to form urea. A liquid stream containing product urea, ammonium carbamate, ammonia, water and dissolved inerts such as methane and argon is withdrawn from vessel 5 via 7 and is processed in a manner to be described infra, to recover product aqueous urea solution and recycle streams.

The remaining gas phase, mainly consisting of hydrogen, nitrogen, ammonia and residual carbon dioxide, now passes upwards into the upper reflux section of unit 5, which is provided with a plurality of bubble cap trays 8 with downcomers. A recycle stream 9 consisting of aqueous ammonium carbamate solution is admitted to an intermediate tray in unit 5. In addition, a temperature gradient is maintained in the upper reflux section by means of cold liquid ammonia, which is passed in above the top tray via 10. The top tray temperature is generally maintained below 130° C. to avoid the ammonia critical point at the elevated operating pressure. Due to the temperature gradient and reflux ammonia, all of the carbon dioxide originally present in the gaseous phase is converted to liquid ammonium carbamate and passed downwards through unit 5. A purified gaseous phase free of carbon dioxide and consisting of hydrogen, nitrogen and ammonia is removed via 11 from unit 5.

Returning to the lower portion of unit 5, the liquid stream 7 containing product urea is removed from unit 5 at high pressure, and passed through pressure reducing valve 12. The resulting stream 13, now typically at a pressure below about 400 p.s.i.g., is passed into purification means 14. Unit 14 is shown schematically as a single vessel, however, as will appear from copending U.S. patent applications Ser. Nos. 6,644, filed Feb. 4, 1960, now U.S. Patent No. 3,155,723, and 5,379, filed Jan. 29, 1960, now U.S. Patent No. 3,155,722, the function and operation of unit 14 may take place in a plurality of vessels and process steps, at two distinct pressure levels. Thus unit 14 is only shown schematically to indicate its function in this preferred embodiment of the invention.

Stream 13 is heated by heating means 15 in unit 14, whereby ammonium carbamate decomposition and generation of a mixed ammonia-carbon dioxide off-gas takes place. As indicated supra, this process step may actually take place in a plurality of stages, as described in the cited applications. The residual liquid phase is drawn off via 16 as an aqueous urea product solution. The rising off-gas stream passes through packed section 17 in unit 14, and is scrubbed and partially condensed by circulating aqueous ammonium carbamate solution. This solution is drawn off above liquid baffle 18 via 19, discharged through pump 20 via 21 and partially recycled above the packed section 17 via 22 after cooling, not shown. The balance of stream 21 is passed via 23 to recycle pump 24, compressed to urea synthesis pressure between about 2500 p.s.i.g. to 6000 p.s.i.g. and recycled via 9 to unit 5.

The residual off-gas stream in unit 14 above packed section 17 now principally consists of ammonia. The off-gas stream is further purified in upper reflux section 25 of vessel 14, and finally an ammonia gas stream free of carbon dioxide is withdrawn via 26. Details of this purification process and apparatus are contained in the U.S. patent applications, now U.S. Patents Nos. 3,155,723, 3,155,722, and 3,191,916, cited supra. The ammonia vapor stream 26 contains inerts derived from stream 7, and thus the ammonia vapor component of stream 26 is condensed to liquid in cooler 27 provided with cooling means 28, which may include refrigeration, not shown. The residual gaseous phase consisting of inerts is discharged via 29. Pure liquid ammonia is withdrawn from condenser 27 via 30, preferably at a temperature below 130° C., and is compressed in unit 31 to a pressure in the range of 2500 p.s.i.g. to 6000 p.s.i.g. and recycled via 32. Stream 32 is combined with synthesized liquid ammonia stream 33, and the resulting ammonia stream 34 is preheated in heater 35 provided with heating coil 36. The ammonia is preferably preheated to a temperature above 80° C. in unit 35, and is recycled via 4 to urea synthesis.

Referring now to off-gas stream 11 derived from unit 5 and containing hydrogen, nitrogen and ammonia, stream 11 is passed to cooler 37, which is provided with cooling or refrigeration inlet 38 and exit 39. At least a portion of the ammonia content of gas stream 11 is thus condensed to liquid ammonia. The resulting cooled stream 40 is passed to gas-liquid separator 41, and the liquid ammonia component is withdrawn via 42, combined with liquid ammonia stream 43, and recycled via 10 as cold liquid ammonia reflux. A recycle pump, not shown, may be provided in line 42 to compensate for fluid pressure drop in the urea synthesis section, which is at a lower pressure than stream 43.

The gaseous portion of stream 40 is withdrawn via 44 from unit 41, and is combined with recirculating ammonia synthesis gas stream 45, which also mainly consists of nitrogen, hydrogen and residual ammonia vapor. The combined gas stream 46 now passes through gas circulator 47, which provides a gas pressure head to make up for pressure drop through the ammonia synthesis loop. The discharged gas stream 48 passes through final gas cooler 49. The gas stream is cooled in unit 49, preferably to a temperature below 10° C., to provide further ammonia condensation. Refrigeration fluid is admitted via 50 and removed via 51. The resulting gas stream 52 containing condensed liquid ammonia is passed to gas-liquid separator 53, and a final liquid ammonia component is removed via 54. A portion of stream 54 is recycled for cold liquid ammonia reflux via 43, while the balance of stream 54 is passed via 55 and combined with primary liquid ammonia stream 56 to form ammonia feed stream 33 which is passed to urea synthesis as described supra.

Returning to unit 53, the gaseous portion of stream 52 is withdrawn via 57, and a portion of stream 57 is discharged to purge via 58 to remove inerts from the ammonia synthesis loop. Stream 58 also contains ammonia, hydrogen and nitrogen. It will be evident that the volume of stream 58 is substantially reduced compared to prior art procedures, since a large portion of the inerts originally present in stream 3 were removed via 7 and discharged via 29. The major portion of stream 57 now passes via 59 to catalytic ammonia converter 60. Ammonia is synthesized from hydrogen and nitrogen in unit 60, which is shown only in schematic outline. Actual details of a typical unit are presented in U.S. Patent No. 2,853,371. The effluent stream 61 derived from unit 60 is now passed to ammonia condenser 62, which is provided with cooling water inlet 63 and outlet 64. The outlet gas stream 65 is cooled to a temperature preferably below 40° C., to condense a primary stream of liquid ammonia. Gas stream 65 containing condensed liquid ammonia is passed to gas-liquid separator 66. Liquid ammonia is removed from unit 66 via 56, and the residual synthesis gas stream is recycled via 45.

Various alternatives within the scope of the present invention will occur to those skilled in the art. Thus, in some cases stream 42 may be of sufficient magnitude to provide adequate reflux ammonia for complete carbon dioxide condensation. The quantity of reflux ammonia required for this purpose is a function of the pressure and temperature levels in unit 5. In this case, stream 43 may be omitted, thus providing a greater ammonia excess in the liquid phase in the lower portion of unit 5. This is advantageous since greater conversion of ammonium carbamate to urea is thus accomplished.

It is feasible with highly elevated pressure and lower temperature in unit 5 to remove a major portion of the ammonia stream 4 via liquid phase 7. In this case, a portion of liquid ammonia stream 30 may be withdrawn as ammonia product. Excess ammonia may also be withdrawn from the system as a product from the high pressure liquid ammonia streams 56, 54 or 42, however, it is most desirable to conserve the high pressure ammonia for process usage in urea synthesis, thus reducing compression costs. Lower temperature in unit 5 may be achieved by providing cooling coils on bubble cap trays 8.

Although stream 1 is preferably produced by catalytic steam reforming of a fluid hydrocarbon, solid hydrocarbon fuels such as coal or coke may also be employed as raw material for the production of a crude synthesis gas, employing well-known procedures such as the water gas reaction with steam or partial oxidation.

An example of an industrial application of the process of the present invention will now be described.

*Example*

A process was designed for reaction of ammonia synthesis make-up gas containing carbon dioxide with synthesized liquid ammonia in accordance with the present invention. The liquid ammonia was preheated to 90° C. and reacted with the synthesis gas stream and recycle aqueous ammonium carbamate solution at 190° C. and 4700 p.s.i.g. The resulting liquid process component containing product urea was passed to a conventional processing sequence at a pressure below 400 p.s.i.g. for recovery of product urea solution, recycle aqueous ammonium carbamate solution and recycle pure ammonia.

The residual gas phase from urea synthesis was cooled to a temperature of 120° C. and refluxed with recycle liquid ammonia, to produce a gas phase free of carbon dioxide and consisting of nitrogen, hydrogen and ammonia vapor. This gas phase was combined with recycle ammonia synthesis gas from the ammonia loop, and the combined gas stream was refrigerated to 0° C. at 5000 p.s.i.g. to condense and separate liquid ammonia. After purging to remove inerts, the gas stream was passed to ammonia synthesis. The resulting gas stream containing ammonia was cooled to 30° C. at 4700 p.s.i.g., and primary liquid ammonia was separated. The high pressure liquid ammonia streams were combined, together with compressed recycle ammonia derived from product urea solution recovery, and the combined liquid ammonia stream was passed to urea synthesis as described supra.

Following is a material balance, showing compositions of the major process streams shown in the figure. All flow quantities are expressed in mols/hour, based on the production of 100 mols/hour of urea. The material balance is based on total utilization of ammonia in urea synthesis, however it will be evident that suitable reduction of the ratio of input carbon dioxide to hydrogen-nitrogen will result in the production of a net excess of ammonia.

| Stream No. | Stream Composition, Mols/Hour | | | | | | | |
|---|---|---|---|---|---|---|---|---|
| | Ammonia | Carbon Dioxide | Water | Urea | Hydrogen | Nitrogen | Total Inerts | Total Mols |
| 3 | | 100.5 | | | 325 | 108.33 | 2.39 | 536.22 |
| 4 | 344 | | | | 3.6 | 1.2 | 1.31 | 350.11 |
| 9 | 168 | 61 | 89 | | | | | 318.00 |
| 43 | 227 | | | | 4.3 | 1.15 | 1.14 | 233.59 |
| 7 | 312 | 61.50 | 189 | 100 | 8.5 | 2.83 | 0.36 | 674.19 |
| 11 | 227 | | | | 324.4 | 107.85 | 4.48 | 663.73 |
| 46 | 386.35 | | | | 1,588.3 | 529.05 | 249.57 | 2,753.27 |
| 45 | 159.35 | | | | 1,263.9 | 421.2 | 245.09 | 2,089.54 |
| 59 | 79.35 | | | | 1,570.0 | 523.0 | 246 | 2,418.35 |
| 55 | 79.25 | | | | 1.5 | 0.4 | 0.4 | 81.55 |
| 65 | 282.30 | | | | 1,266.00 | 422.00 | 246 | 2,216.30 |
| 56 | 123 | | | | 2.1 | 0.8 | 0.91 | 126.81 |
| 33 | 202.25 | | | | 3.6 | 1.2 | 1.31 | 208.36 |
| 30 | 141.75 | | | | | | | 141.75 |
| 29 | 1.0 | | | | 8.5 | 2.83 | 0.36 | 12.69 |
| 16 | 1.25 | 0.50 | 100 | 100 | | | | 201.75 |
| 58 | 0.7 | | | | 13.90 | 4.60 | 2.03 | 21.23 |

In the process represented by the material balance tabulated supra, the processing of gas stream 11 in unit 37, with subsequent separation of a liquid ammonia recycle stream 42 for reflux, has been omitted.

We claim:

1. In an ammonia synthesis process in which a hydrocarbon is reformed with steam and air to produce a crude reformed gas mixture principally containing hydrogen, nitrogen, carbon monoxide and steam, the carbon monoxide in the crude reformed gas mixture is catalytically reacted with steam to produce further hydrogen and carbon dioxide, thereby forming a final reformed gas mixture principally containing hydrogen, nitrogen and carbon dioxide, the final reformed gas mixture is processed to remove carbon dioxide, the resulting ammonia synthesis gas stream is passed to catalytic ammonia synthesis at elevated pressure, and the ammonia synthesis effluent gas stream is cooled to condense and separate liquid ammonia, the improvement which comprises compressing the final reformed gas mixture containing hydrogen, nitrogen and carbon dioxide to elevated urea and ammonia synthesis pressure, reacting the compressed reformed gas mixture with said liquid ammonia under urea synthesis conditions, whereby carbon dioxide in said final reformed gas mixture is converted to urea in a liquid phase and separated from the residual reformed gas mixture, and passing the residual gas phase comprising hydrogen, nitrogen and ammonia vapor from urea synthesis to ammonia synthesis.

2. In an ammonia synthesis process in which a hydrocarbon is reformed with steam and air to produce a crude reformed gas mixture principally containing hydrogen, nitrogen, carbon monoxide and steam, the carbon monoxide in the crude reformed gas mixture is catalytically reacted with steam to produce further hydrogen and carbon dioxide, thereby forming a final reformed gas mixture principally containing hydrogen, nitrogen and carbon dioxide, the final reformed gas mixture is processed to remove carbon dioxide, the resulting purified synthesis gas stream principally containing hydrogen and nitrogen is combined with residual ammonia synthesis effluent gas stream, the combined gas stream is catalytically reacted under ammonia synthesis conditions whereby an ammonia synthesis effluent gas stream containing synthesized ammonia vapor is produced, said ammonia synthesis effluent gas stream is cooled to condense synthesized liquid ammonia, and said synthesized liquid ammonia is separated from the residual gas stream comprising said residual ammonia synthesis effluent gas stream, the improvement which comprises (a) compressing said final reformed gas mixture principally containing hydrogen, nitrogen and carbon dioxide to urea and ammonia synthesis pressure, (b) combining the compressed gas mixture from step (a) with at least a portion of said synthesized liquid ammonia and with aqueous ammonium carbamate solution, (c) reacting the combined process stream from step (b) at urea and ammonia synthesis pressure whereby carbon dioxide in the combined stream is reacted with ammonia to form ammonium carbamate and a portion of the ammonium carbamate in the combined process stream is dehydrated to form urea, (d) separating a mixed gas stream substantially free of carbon dioxide and comprising hydrogen, nitrogen and residual ammonia from the liquid urea synthesis effluent stream containing residual ammonium carbamate, (e) combining the mixed gas stream from step (d) comprising purified synthesis gas stream principally containing hydrogen and nitrogen with said residual ammonia synthesis effluent gas stream, (f) separating an aqueous ammonium carbamate solution and an aqueous urea solution from the liquid urea synthesis effluent stream derived from step (d), and (g) recycling the aqueous ammonium carbamate solution derived from step (f) as said aqueous ammonium carbamate solution of step (b).

3. The process of claim 2, in which the combined gas stream produced by step (e) is cooled prior to catalytic reaction under ammonia synthesis conditions, whereby further liquid ammonia is condensed and separated from the combined gas stream.

4. The process of claim 2, in which a stream of ammonia substantially free of carbon dioxide is also produced from the liquid urea synthesis effluent stream derived from step (d).

5. In an ammonia synthesis process in which a hydrocarbon is reformed with steam and air to produce a crude reformed gas mixture principally containing hydrogen, nitrogen, carbon monoxide and steam, the carbon monoxide in the crude reformed gas mixture is catalytically reacted with steam to produce further hydrogen and carbon dioxide, thereby forming a final reformed gas mixture principally containing hydrogen, nitrogen and carbon dioxide, the final reformed gas mixture is processed to remove carbon dioxide, the resulting purified synthesis gas stream principally containing hydrogen and nitrogen is combined with residual ammonia synthesis effluent gas stream, the combined gas stream is reacted under ammonia synthesis conditions whereby an ammonia synthesis effluent gas stream containing synthesized ammonia vapor is produced, said ammonia synthesis effluent gas stream is cooled to condense synthesized liquid ammonia, and said synthesized liquid ammonia is separated from the residual gas stream comprising said residual ammonia synthesis effluent gas stream, the improvement which comprises (a) compressing said final reformed gas mixture principally containing hydrogen, nitrogen and carbon dioxide to urea and ammonia synthesis pressure, (b) combining the compressed gas mixture from step (a) with at least a portion of said synthesized liquid ammonia, (c) reacting the combined process stream at urea and ammonia synthesis pressure whereby carbon dioxide is combined with ammonia to form ammonium carbamate and a portion of said ammonium carbamate is dehydrated to form urea, (d) separating the resulting stream from step (c) into gaseous and liquid phases, said gaseous phase consisting principally of hydrogen, nitrogen and ammonia together with a minor residual proportion of carbon dioxide, (e) cooling and refluxing the gaseous phase from step (d) at urea and ammonia synthesis pressure with aqueous ammonium carbamate solution and liquid ammonia, whereby residual carbon dioxide is removed from the gaseous phase into liquid solution and a residual gaseous phase substantially free of carbon dioxide and comprising hydrogen, nitrogen and ammonia is produced, (f) combining the residual gaseous phase from step (e) comprising purified synthesis gas stream principally containing hydrogen and nitrogen, with said residual ammonia synthesis effluent gas stream, (g) adding the liquid solution produced by step (e) to the reacting combined process stream of step (c), (h) separating an aqueous ammonium carbamate solution and an aqueous urea solution from the separated liquid phase of step (d), and (i) recycling the aqueous ammonium carbamate solution derived from step (h) as said aqueous ammonium carbamate solution of step (e).

6. The process of claim 5, in which the combined gas stream produced by step (f) is cooled prior to catalytic reaction under ammonia synthesis conditions, whereby further liquid ammonia is condensed and separated from the combined gas stream.

7. The process of claim 5, in which the residual gaseous phase produced from step (e) is cooled, prior to combination with said residual ammonia synthesis effluent gas stream according to step (f), whereby liquid ammonia is condensed and separated from the residual gaseous phase, and said condensed liquid ammonia is recycled as the reflux liquid ammonia of step (e).

8. In an ammonia synthesis process in which a fluid hydrocarbon is reformed with steam and air at a pressure below 600 p.s.i.g. to produce a crude reformed gas mixture principally containing hydrogen, nitrogen, carbon monoxide and steam, the carbon monoxide in the crude reformed gas mixture is catalytically reacted with steam to produce further hydrogen and carbon dioxide, thereby forming a final reformed gas mixture principally containing hydrogen, nitrogen and carbon dioxide, the final reformed gas mixture is processed to remove carbon dioxide, the resulting purified synthesis gas stream principally containing hydrogen and nitrogen is combined with residual ammonia synthesis effluent gas stream, the combined gas stream is reacted under ammonia synthesis conditions whereby an ammonia synthesis effluent gas stream containing synthesized ammonia vapor is produced, said ammonia synthesis effluent gas stream is cooled to a temperature below 40° C. to condense synthesized liquid ammonia, and said synthesized liquid ammonia is separated from the residual gas stream comprising said residual ammonia synthesis effluent gas stream, the improvement which comprises (a) compressing said final reformed gas mixture principally containing hydrogen, nitrogen and carbon dioxide to urea and ammonia synthesis pressure in the range of 2500 p.s.i.g. to 6000 p.s.i.g., (b) heating at least a portion of said synthesized liquid ammonia to a temperature above 80° C., (c) combining the compressed gas mixture from step (a) with the heated liquid ammonia from step (b), (d) reacting the combined process stream from step (c) at urea and ammonia synthesis pressure in the range of 2500 p.s.i.g. to 6000 p.s.i.g. and temperature in the range of 150° C. to 200° C., whereby carbon dioxide is combined with ammonia to form ammonium carbamate and a portion of said ammonium carbamate is dehydrated to form urea,
(e) separating the resulting stream from step (d) into gaseous and liquid phases, said gaseous phase consisting principally of hydrogen, nitrogen and ammonia together with a minor residual proportion of carbon dioxide,
(f) cooling and refluxing the gaseous phase from step (e) at urea and ammonia synthesis pressure with aqueous ammonium carbamate solution and liquid ammonia, said liquid ammonia being at a temperature below 130° C., whereby residual carbon dioxide is removed from the gaseous phase into liquid solution and a residual gaseous phase substantially free of carbon dioxide and comprising hydrogen, nitrogen and ammonia is produced,
(g) combining the residual gaseous phase from step (f) comprising purified residual synthesis gas stream principally containing hydrogen and nitrogen, with said residual ammonia synthesis effluent gas stream,
(h) adding the liquid solution produced by step (f) to the reacting combined process stream of step (d),
(i) separating an aqueous ammonium carbamate solution and an aqueous urea solution from the separated liquid phase of step (e) at a pressure reduced to below 400 p.s.i.g., and
(j) recycling the aqueous ammonium carbamate solution derived from step (i) as said aqueous ammonium carbamate solution of step (f).

9. The process of claim 8, in which the combined gas stream produced by step (g) is cooled prior to catalytic reaction under ammonia synthesis conditions, whereby further liquid ammonia is condensed and separated from the combined gas stream.

10. The process of claim 8, in which the residual gaseous phase produced from step (f) is cooled, prior to combination with said residual ammonia synthesis gas stream according to step (g), whereby liquid ammonia is condensed and separated from the residual gaseous phase, and said condensed liquid ammonia is recycled as the reflux liquid ammonia of step (f).

11. The process of claim 8, in which the pressure during said urea synthesis reaction of step (d) and during said reaction of the combined gas stream under ammonia synthesis conditions is in the range of 4000 p.s.i.g. to 4500 p.s.i.g.

References Cited by the Examiner
UNITED STATES PATENTS

| | | | |
|---|---|---|---|
| 2,610,106 | 9/1952 | Gray | 23—199 |
| 3,069,234 | 12/1962 | Cook et al. | 23—199 |

OTHER REFERENCES

W. H. Tonn, Jr.: "How the Competitive Urea Processes Compare Today," Chemical Engineering, vol. 62, October 1955, pages 186–190, 250–55.

OSCAR R. VERTIZ, *Primary Examiner.*

J. J. BROWN, B. LEVENSON, *Assistant Examiners.*